United States Patent [19]
Bourges et al.

[11] Patent Number: 6,126,912
[45] Date of Patent: Oct. 3, 2000

[54] PROCESS AND CATALYST COMPRISING AT LEAST ONE EU-1 AND/OR NU-86 AND/OR NU-87 ZEOLITE FOR REDUCING OXIDES OF NITROGEN IN AN OXIDIZING MEDIUM

[75] Inventors: Patrick Bourges, Rueil Malmaison; Gil Mabilon, Carrieres sur Seine; Matthias Bouchez, Meudon; Sylvie Lacombe, Rueil Malmaison, all of France

[73] Assignee: Institut Francais du Petrole, France

[21] Appl. No.: 09/222,298

[22] Filed: Dec. 28, 1998

[30] Foreign Application Priority Data

Dec. 26, 1997 [FR] France .................................. 97 16650

[51] Int. Cl.⁷ ................................ B01J 8/00; B01J 29/06; B01J 21/00; C01B 21/00
[52] U.S. Cl. ................... 423/239.1; 423/235; 423/239.2; 502/63; 502/64; 502/65; 502/66; 502/74
[58] Field of Search .................................. 502/63, 64, 65, 502/66, 74; 423/DIG. 36, DIG. 21, 235, 239.1, 239.2

[56] References Cited

U.S. PATENT DOCUMENTS 5,171,553  12/1992  Li et al. .................................. 423/239
5,345,021   9/1994  Casci et al. ............................. 585/467

FOREIGN PATENT DOCUMENTS 0 445 816   9/1991  European Pat. Off. .
0 525 701   2/1993  European Pat. Off. .
0 541 008   5/1993  European Pat. Off. .
36 31 950   3/1988  Germany .

*Primary Examiner*—Steven P. Griffin
*Assistant Examiner*—Maribel Medina
*Attorney, Agent, or Firm*—Milen, White, Zelano & Branigan, P.C.

[57] ABSTRACT

The present invention provides a process for reducing oxides of nitrogen to molecular nitrogen in a medium which is superstoichiometric in oxidizing agent using reducing agents in the presence of a catalyst comprising:

- at least one refractory inorganic oxide at least in part constituted by a zeolite from the group formed by NU-86, NU-87 and EU-1;
- optionally, at least one element (A) from groups VIB, VIIB, VIII and IB, the transition metals;
- optionally, at least one element (B) from group VIII, the noble metals comprising platinum, rhodium, ruthenium, iridium and palladium;
- and optionally at least one element (C) from group IIA, the alkaline-earths and/or group IIIB, the rare earths.

The invention also provides a catalyst comprising at least one refractory inorganic oxide at least in part constituted by at least one zeolite from the group formed by NU-86, NU-87 and EU-1 and at least one element selected from the group formed by elements from groups VIB, VIIB, VIII and IB, the transition metals, and from noble group VIII metals. The invention also concerns the preparation of the catalyst.

23 Claims, No Drawings

PROCESS AND CATALYST COMPRISING AT LEAST ONE EU-1 AND/OR NU-86 AND/OR NU-87 ZEOLITE FOR REDUCING OXIDES OF NITROGEN IN AN OXIDIZING MEDIUM

SUMMARY OF THE INVENTION

The present invention relates to a process for eliminating oxides of nitrogen (NO and $NO_2$, known as $NO_x$) in a medium which is superstoichiometric in oxidising agents, in the presence of a catalyst characterized by a high activity at low temperatures and by good selectivity for converting oxides of nitrogen to molecular nitrogen to the detriment of the unwanted formation of nitrous oxide ($N_2O$). The invention also relates to a catalyst which can be used in that process, and to its preparation.

Catalysts used in the process of the present invention can, inter alia, be used to eliminate oxides of nitrogen present in the exhaust gases from lean burn vehicle engines or stationary engines, whether compression ignition engines or lean burn spark ignition engines. Such catalysts can also be used to eliminate oxides of nitrogen from fumes from power stations, waste incinerators or gas turbines. Such exhaust gases or fumes are characterized by oxides of nitrogen contents of a few tens to a few thousands of parts per million (ppm), by comparable amounts of reducing compounds (CO, $H_2$, hydrocarbons), and above all by large concentrations of oxygen (0.5 to close to 20% by volume).

The high toxicity of oxides of nitrogen, their role in the formation of acid rain and tropospheric ozone have led to the development of strict standards limiting the discharge or such compounds. In order to satisfy those standards, it is generally necessary to eliminate at least part of those oxides present in the exhaust gas from vehicle engines or stationary engines, or turbines or power stations, or form incinerators.

The elimination of oxides of nitrogen by thermal decomposition or, preferably, by catalytic decomposition, can be envisaged, but the high temperatures demanded by this reaction are incompatible with those of the exhaust gases. It appears that they can be reduced essentially by the reducing agents present (in small quantities) in the exhaust gas (CO, $H_2$, unburned hydrocarbons), but also by complementary reducing compounds which it would be necessary to inject upstream of the catalyst. These reducing agents are hydrocarbons, alcohols, ethers or other oxygen-containing compounds.

According to the equations below, reducing nitrogen monoxide and nitrogen dioxide (NO and $NO_2$) can lead to the formation either of molecular nitrogen ($N_2$) or of nitrous oxide ($N_2O$).

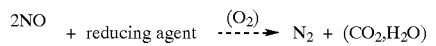
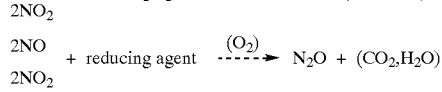

Molecular nitrogen ($N_2$) is the desired, inoffensive, product while the formation of nitrous oxide ($N_2O$), a greenhouse gas, must be avoided as much as possible.

The essential parameters for characterizing catalyst performance in eliminating oxides of nitrogen are:

the temperature at which conversion is a maximum;
the conversion or degree of elimination of $NO_x$;
the selectivities towards $N_2$ and $N_2O$;

and above all the yield of $N_2$ from the $NO_x$ reduction reaction which can be expressed by the relationship:

$$N_2 \text{ yield} = 100 \times \frac{NO_x \text{ disappeared} - 2 \times (N_2O \text{ formed})}{NO_x \text{ initial}}$$

The majority of work developing catalysts which are active in eliminating oxides of nitrogen in an oxidising medium relate to the development of transition metals (generally copper) exchanged on zeolites with Si/Al atomic ratios generally in the range 3 to 100 and which can have different structure types (mordenite, faujasite, ZSM-5) (U.S. Pat. No. 5,149,512). Such catalysts are active in converting oxides of nitrogen at temperatures in the range 350° C. to 550° C. Those conditions thus limit their use to depolluting exhaust gases from lean burn petrol engines and heavy duty diesel engines when those are operating at full throttle and at high speeds. For light diesel engines, the temperature of the exhaust gases is generally in the range 150° C. to 300° C. and rarely exceeds 500° C., which restricts the efficiency of those catalysts when eliminating oxides of nitrogen when the vehicle is used under normal conditions.

Further, it is known that the thermal stability of copper catalysts exchanged onto zeolite can be improved by adding alkaline-earth elements and rare earth elements (lanthanum, P. Budi et al., Catalysis Letters 41, (1996) 47–53, and cerium, Y. Zhang et al., Journal of Catalysis (1996), 131–154).

The use of noble metals as the active phase also enables the major portion of the oxides of nitrogen to be eliminated in proportions comparable to those measured for copper catalysts (European patent EP-A-0 709 129). Those catalytic phases have the advantage of being active at much lower temperatures (200–300° C.), which is a major advantage in depolluting exhaust gases from diesel engine vehicles where the temperatures at the engine outlet are generally in the range 150° C. to 300° C.

The noble metals can be impregnated into different supports such as alumina, silica, zirconia, titanium oxide or zeolites. Platinum catalysts supported on zeolite (ZSM-5) can be prepared by ion exchange (EP-A-0 709 129).

Adding alkaline-earth metals or rare earth metals to a catalyst comprising noble metals (generally platinum) is aimed at improving the thermal stability of the catalyst and increasing its service life. A catalyst has been proposed in which platinum and lanthanum are deposited on a porous support to eliminate pollutants, among them $NO_x$, in an exhaust gas containing an excess of oxygen (Japanese patent JP-A-05/168 862).

Tin general, the catalysts are very active at low temperatures for converting the oxides of nitrogen NO and $NO_2$. However, the majority of such catalysts have the drawback of only partially reducing $NO_x$, namely the product formed in the majority is not molecular nitrogen ($N_2$) but nitrous oxide ($N_2O$).

The aim of the present invention is to provide a process for eliminating oxides of nitrogen from a highly oxidising gaseous mixture both at low temperatures (150–300° C.) and at higher temperatures (300–600° C.) in the presence of a catalyst, with a yield of molecular nitrogen which is substantially improved over prior art catalysts. This improvement is obtained by reducing the selectivity for reducing oxides of nitrogen to nitrous oxide ($N_2O$) and as a result, increasing the selectivity for reducing oxides of nitrogen to $N_2$.

The process of the invention enables oxides of nitrogen to be reduced using carbon monoxide, hydrogen, hydrocarbons, alcohols, ethers and other oxygen-containing organic compounds, as well as the fuel for the vehicle, as the reducing agent. Such fuels can be gasolines, which may or may not contain oxygen-containing compounds (for example alcohols or ethers), gas oils, liquefied petroleum gas (LPG) or compressed natural gas (CNG) as additives.

The Applicant has discovered that a catalyst containing at least one zeolite selected from NU-86, NU-87 and EU-1 zeolites surprisingly improves the nitrogen yield when reducing oxides of nitrogen in exhaust gases which are superstoichiometric in oxygen. These zeolites have been described in EP-A-0 463 768 (NU-86 zeolite), EP-A-0 378 916 (NU-87 zeolite) and EP-A-0 042 226 (EU-1 zeolite). At least one transition metal, preferably copper, and/or at least one noble metal, preferably platinum, is/are optionally added to this support. At least one element from the alkaline-earth and rare earth groups can optionally be added to this support. This catalyst can enable oxides of nitrogen present in a gas which is superstoichiometric in oxidising agent, in particular oxygen, to be eliminated, by reduction using reducing agents present in the medium, and/or injected upstream of the catalyst. The reaction is carried out at a temperature in the range 150° C. to 600° C., preferably at a low temperature if a noble metal from the platinum family is added to the zeolite, or preferably at a higher temperature if a transition metal is added to the zeolite, with a high yield of molecular nitrogen and a low selectivity for nitrous oxide, an unwanted product.

The catalyst is in the form of beads, pellets or extrudates. The active phase of the catalyst can also be deposited or prepared directly onto monolithic ceramic or metal supports.

Thus the process of the invention is carried out in the presence of a catalyst comprising:

at least one refractory inorganic oxide at least in part constituted by at least one zeolite from the group formed by NU-86, NU-87 and EU-1;

optionally, at least one element (A) from groups VIB, VIIB, VIII and IB, the transition metals;

optionally, at least one element (B) from group VIII, the noble metals, comprising platinum, rhodium, ruthenium, iridium and palladium;

and optionally, at least one element (C) from group IIA, the alkaline-earths and/or group IIIB, the rare earths.

Preferably, the composition by weight of the active phase, expressed in weight percent with respect to the total weight of the active phase calcined at 550° C. for 4 hours, is as follows:

55% to 100% of at least one refractory inorganic oxide at least in part constituted by at least one zeolite selected from the group formed by NU-86, NU-87 and EU-1 zeolites;

0 to 20% of at least one element (A) from groups VIB, VIIB, VIII and IB, the transition metals, expressed as the oxide;

0 to 5% of at least one element (B) from group VIII, the noble metals, comprising platinum, rhodium, ruthenium, iridium and palladium; and 0 to 20% of at least one element (C) from group IIA, the alkaline-earths, and/or group IIIB, the rare earths, expressed as the oxide.

The present invention also provides a catalyst, particular for use in the process for reducing oxides of nitrogen of the present invention. This catalyst comprises at least one refractory inorganic oxide at least in part constituted by at least one zeolite from the group formed by NU-86, NU-87 and EU-I zeolites, and at least one element selected from the group formed by elements from groups VIB, VIIB, VIII and IB, the transition metals, and those from group VIII, the noble metals.

In a first embodiment, the catalyst of the invention contains at least one refractory inorganic oxide at least in part constituted by at least one zeolite selected from the group formed by NU-86, NU-87 and EU-1 zeolites, and at least one element (A) and optionally at least one element (C), the composition by weight of the catalyst, expressed as the weight percent with respect to its anhydrous weight, calcined at 550° C. for 4 hours, being as follows:

80% to 99% of at least one refractory inorganic oxide at least in part constituted by at least one zeolite selected from the group formed by NU-86, NU-87 and EU-1zeolites;

1% to 10% of at least one element (A) from groups VIB, VIIB, VIII and IB, the transition metals, expressed as the oxide; and 0 to 10% of at least one element (C) from group IIA, the alkaline-earths, and/or group IIIB, the rare earths, expressed as the oxide.

When the catalyst contains at least one element (C), the catalyst contains 0.1% to 10% by weight of element (C) with respect to the total catalyst weight.

In a second embodiment, the catalyst of the invention contains at least one refractory inorganic oxide at least in part constituted by at least one zeolite selected from the group formed by NU-86, NU-87 and EU-1 zeolites, and at least one element (B) and optionally at least one element (C), the composition by weight of the catalyst, expressed as the weight percent with respect to its anhydrous weight, calcined at 550° C. for 4 hours, being as follows:

87% to 99.9% of at least one refractory inorganic oxide at least in part constituted by at least one zeolite selected from the group formed by NU-86, NU-87 and EU-1 zeolites;

0.1% to 3% of at least one element (B) from group VIII, the precious metals, comprising platinum, rhodium, ruthenium, iridium and palladium; and 0 to 10% of at least one element (C) from group IIA, the alkaline-earths, and/or group IIIB, the rare earths, expressed as the oxide.

When the catalyst contains at least one element (C), the catalyst contains 0.1% to 10% by weight of element (C) with respect to the total catalyst weight.

The refractory inorganic oxide is generally at least one compound selected from the group formed by the following compounds: NU-86 zeolite, NU-87 zeolite and EU-1 zeolite, and can further contain at least one compound selected from alumina, silica, silica-alumina, titanium oxide, zirconium oxide, a mixed oxide or a solid solution of at least two of the above oxides, or a mixture of at least two of these compounds. However, the Applicant prefers to use zeolites selected from the group formed by NU-86, NU-87 and EU-1 zeolites of a mixture or at least two of these zeolites as the refractory inorganic oxides. The weight of NU-86 and/or NU-87 and/or EU-1 with respect to the weight of the ensemble of refractory inorganic oxides is generally in the range 50% to 100% and preferably in the range 80% to 100%.

Preferred elements (A) from groups VIB, VIIB, VIII and IB of the periodic table are copper, nickel, cobalt, iron, manganese, chromium and molybdenum or a mixture of at least two of these elements. Element (A) is preferably copper.

Of the noble metals (B) cited above, platinum is the preferred metal.

In order to improve the thermal stability of the catalyst, at least one element (C) from group IIA, the alkaline-earths, and/or group IIIB, the rare earths, can optionally be added. Preferably, calcium, barium, strontium, lanthanum, cerium or a mixture of at least two of these elements is used. More preferably, element (C) is lanthanum.

The catalysts of the invention, which are active for selective reduction of oxides of nitrogen to molecular nitrogen, are in the form of beads, pellets or extrudates.

This invention also relates to the preparation of the catalyst. The following steps are carried out to prepare the support:

a) optionally, one or more steps for impregnating a support constituted by at least one zeolite from the group formed by NU-86, NU-87 and EU-1 using at least one precursor of at least one transition element (A) and/or at least one precursor of at least one noble metal (B);

b) optionally, adding an element (C) from group IIA, the alkaline-earths, or group IIB, the rare earths, by impregnation with at least one precursor of at least one element from groups IIA and IIIB of the periodic table, before or after the impregnation step or steps; and c) optionally, a heat treatment step carried out in an oxidising, neutral or reducing medium after each impregnation step, at a temperature in the range 200° C. to 700° C.

When the catalyst comprises it, elements (A), (B) and (C) are added to the refractory inorganic oxide by impregnation with aqueous or organic solutions of precursors of the metal or oxides of these elements, using techniques which are known to the skilled person, termed dry or excess techniques.

Thus when the catalyst comprises at least one refractory inorganic oxide at least in part constituted by at least one zeolite selected from the group formed by NU-86, NU-87 and EU-1 zeolites and at least one element (A) and/or at least one element (B), the preparation steps are as follows:

a) one or more steps for impregnating a support at least in part constituted by at least one zeolite from the group formed by NU-86, NU-87 and EU-1 using at least one precursor of at least one transition element (A) and/or at least one precursor of at least one noble metal (B);

b) optionally, adding an element (C) from group IIA, the alkaline-earths, or group IIIB, the rare earths, by impregnating with at least one precursor of at least one element from groups IIA and IIIB of the periodic table, before or after the impregnation step or steps; and c) optionally, a heat treatment step carried out after each impregnation step in an oxidising, neutral or reducing medium at a temperature in the range 200° C. to 700° C.

The precursors of transition metal (A) are in general selected from nitrates, acetates and formates, in aqueous solutions, and acetylacetonates, which can be used in an organic medium.

The precursors for noble metals (B) are those conventionally used to prepare catalysts, in particular and (when they exist), chlorides, the homologous acids of the chlorides, chlorine-containing complexes, nitrates, amine complexes, and acetylacetonates. Non limiting examples are hexachloroplatinic acid, platinum tetrammine chloride, dinitrosodiammino platinum, hexachloroiridic acid, ruthenium trichloride and ruthenium pentammine dichloride.

The precursors for element (C) from group IIA, the alkaline-earths, can be introduced in the form of pigments such as oxides, carbonates or sulphates. Preferably, however, precursors of these elements are impregnated into the refractory oxide. In this case, the water-soluble salts used are preferably nitrates, acetates and formates. The precursors of element (C) from group IIIB, the rare earths, can be introduced in the form of pigments and are thus carbonates, oxalates or sulphates; preferably, however, impregnation is carried out using an aqueous solution of at least one of their precursors such as a nitrate.

The catalyst can be formed as beads, extrudates or pellets, and forming can take place at any stage of the preparation. Preferably, the forming step is carried out directly on the refractory inorganic oxide before any modification, or after all of the impregnation and calcining steps have been carried out.

For use in a vehicle, it is normally preferably to use rigid supports (monoliths) with a large open porosity (over 70%) to limit pressure drops which could cause high gas flow rates, but above all high space velocities for the exhaust gases. These pressure drops contribute to a drop in efficiency in internal combustion engines (petrol or diesel). Further, the exhaust system is subjected to vibrations and to large mechanical and thermal shocks, and catalysts in the form of beads, pellets or extrudates would risk being spoiled either by attrition or by fracturing.

These monoliths can be:

either ceramic, the main elements of which can be alumina, zirconia, cordierite, mullite, silica, aluminosilicates or a combination of a number of those compounds;

or silicon carbide and/or nitride;

or aluminium titanate;

or metal.

Metal supports can be formed by rolling up corrugated strips or by stacking corrugated metal sheets to constitute a honeycomb structure with straight or zigzag channels which may or may not communicate with each other. They can also be produced from tangled, woven or braided fibres or threads.

For metal supports comprising aluminium in their composition, it is recommended that they be pre-treated at high temperature (for example between 700° C. and 1100° C.) to develop a micro-layer of refractory alumina on the surface. This superficial micro-layer, with a porosity and a specific surface area which are higher than that of the starting metal, encourages capture of the active phase while protecting the remainder against corrosion.

The catalyst is prepared by coating these monolithic supports with a suspension including all or part of the elements constituting the catalytic phase. The elements which are not introduced in the preceding steps are impregnated into the coated monolith in one or more steps in the form of a solution of their precursor salts.

The different steps of a method for preparing a catalyst on a monolithic support consists of coating the support with the refractory inorganic oxide, then optionally successively impregnating the precursors of the different elements constituting the catalytic phase. Each of these impregnation steps is optionally followed by a specific heat treatment which is aimed at stabilising and conditioning the phase which has been produced, to place it in a state which is most suitable for interaction with the next phase.

The refractory inorganic oxide is coated onto the ceramic or metal monolithic support using a technique which is known to the skilled person. The coating technique consists of preparing an aqueous suspension of this refractory inorganic oxide with a mineral or organic compound which enables that oxide to become fixed to the support. In general that compound, termed a binder, is an alumina gel (boehmite) or a silica sol, which is added to the suspension comprising a mineral or organic acid (peptising agent). The oxide is deposited by immersing the monolith in the suspension, by circulating suspension through the monolith or by spraying the suspension onto the monolith. After eliminating the excess suspension, the oxide film is fixed on the support by drying then calcining the ensemble at a temperature which is generally in the range 300° C. to 900° C., preferably in the range 400° C. to 600° C.

The quantity of catalytic phase (or active phase) deposited on the monolithic support (or substrate) is generally in the range 20 to 300 g per liter of said support, advantageously between 50 and 200 g.

EXAMPLES

Examples 1 to 3, 5 to 7, 9 to 11, 13 to 15 and 17 to 19 below illustrate the invention without limiting its scope. In these examples, only the direct preparation of catalysts on a monolithic support is described. However, these phases can also be prepared on bead, extrudate or pellet supports, preformed before preparation, or formed by bowl granulation, extrusion or pelletization.

Examples 4, 8, 12, 16 and 20 describe prior art catalyst preparations. By way of comparison, all these catalysts were laboratory tested (Example 21) in a micro-unit with a synthetic gas mixture.

In all of the examples, the term "active phase" (or catalytic phase) deposited on the support (or substrate) corresponds to the sum of the elements constituting the catalyst described in the procedure below, namely at least one refractory inorganic oxide, optional transition metal oxides (A), optional noble metals (B) and optional oxides of alkaline-earth or rare earth elements (C). The weight contents of each of the constituents of this catalytic phase does not take into account the weight of the monolithic ceramic or metal substrate.

As is standard practice in the art, the quantities of noble metals present in the catalyst are generally expressed in grams per liter of support. The weight contents of the different elements constituting the catalytic phase (or active phase) are mentioned in Table 1.

Example 1 (invention)
Preparation of a Catalyst Containing NU-86 Zeolite 250 g of powdered silica gel was dispersed in 2500 cm$^3$ of distilled water. 850 g of NU-86 zeolite was then introduced.

This suspension was ground such that the average granulometry of the solid particles was below 10 microns.

A 0.904 liter ceramic monolith with a honeycomb structure and a density of 62 cells per cm$^2$, sold by Corning, was coated with the suspension. This was accomplished by immersing the support in the medium for a few seconds, then shaking and blowing off the excess product obstructing the channels. The support, coated with a film of material, was dried then calcined at 550° C. to fix the coating (wash coat) to the support.

The final heat treatment was carried out in air at 550° C. for 4 hours.

Example 2 (invention)
Preparation of a Catalyst Containing NU-87 Zeolite.

The catalyst preparation of Example 1 was repeated, with the exception that the NU-86 zeolite was replaced by NU-87 zeolite.

Example 3 (invention)
Preparation of a Catalyst Containing EU-1 Zeolite

The catalyst preparation of Example 1 was repeated, with the exception that the NU-86 zeolite was replaced by EU-1 zeolite.

Example 4 (comparative)
Preparation of a Catalyst Containing ZSM-5 Zeolite

The catalyst preparation of Example 1 was repeated, with the exception that the NU-86 zeolite was replaced by ZSM-5 zeolite

Example 5 (invention)
Preparation of a Catalyst by Cu/NU-86 Zeolite Exchange A monolith coated with NU-86 was prepared according to preparation described in example 1.

The monolith coated with NU-86 zeolite was then impregnated by exchange with a copper acetate solution. Impregnation battery exchange into the zeolite coated onto the monolith was accomplished by circulating 5 l of a copper acetate solution (0.01 M) through the monolith in a closed loop for 24 hours at room temperature. The resulting copper exchanged catalyst was washed by circulating 5 l of distilled water through the monolith, then drying at 110° C. for 8 hours.

The final heat treatment was carried out in air at 550° C. for 4 hours.

The quantity of copper deposited by exchange was 3% by weight.

Example 6 (invention)
Preparation of a Catalyst by Cu/NU-87 Zeolite Exchange The catalyst preparation of Example 5 was repeated, with the exception that the NU-86 zeolite was replaced by NU-87 zeolite.

Example 7 (invention)
Preparation of a Catalyst by Cu/EU-1 Zeolite Exchange

The catalyst preparation of Example 5 was repeated, with the exception that the NU-86 zeolite was replaced by EU-1 zeolite.

Example 8 (comparative)
Preparation of a Catalyst by Cu/ZSM-5 Zeolite Exchange The catalyst preparation of Example 5 was repeated, with the exception that the NU-86 zeolite was replaced by ZSM-5 zeolite.

Example 9 (invention)
Preparation of a Catalyst by Pt/NU-86 Exchange

A monolith coated with NU-86 was prepared according to preparation described in example 1.

The monolith coated with NU-86 zeolite was then impregnated by exchange with an ammoniacal solution of platinum (II) tetrammine dichloride ($Pt(NH_3)_4Cl_2.H_2O$) at a pH of 10. Impregnation by exchange into the zeolite coated onto the monolith was accomplished as follows: 2.5 g of platinum (II) tetrammine dichloride ($Pt(NH_3)_4Cl_2.H_2O$) was introduced into 5 l of ammoniacal solution at a pH of 10. The solution obtained circulated through the monolith in a closed loop for 24 hours at room temperature. The resulting platinum exchanged catalyst was washed by circulating 5 l of distilled water through the monolith, then drying at 110° C. for 8 hours.

The final heat treatment was carried out in air at 550° C. for 4 hours.

The quantity of platinum deposited by exchange was 1% by weight.

Example 10 (invention)
Preparation of a Catalyst by Pt/NU-87 Zeolite Exchange The catalyst preparation of Example 9 was repeated, with the exception that the NU-86 zeolite was replaced by NU-87 zeolite.

Example 11 (invention)
Preparation of a Catalyst by Pt/EU-1 Zeolite Exchange The catalyst preparation of Example 10 was repeated, with the exception that the NU-86 zeolite was replaced by EU-1 zeolite.

Example 12 (comparative)
Preparation of a catalyst by Pt/ZSM-5 Zeolite Exchange The catalyst preparation of Example 10 was repeated, with the exception hat the NU-86 zeolite was replaced by ZSM-5 zeolite.

Example 13 (invention)
Preparation of a Catalyst by Cu-La/NU-86 Exchange

A monolith coated with NU-86 was prepared according to preparation described in example 1.

The monolith coated with NU-86 zeolite was then impregnated by exchange with a lanthanum nitrate solution. Impregnation by exchange into the zeolite coated onto the monolith was accomplished as follows: 5 l of lanthanum nitrate solution (0.01 M) was circulated through the monolith in a closed loop for 24 hours at room temperature. The resulting lanthanum-exchanged catalyst was washed by circulating 5 l of distilled water through the monolith, then drying at 110° C. for 8 hours. The catalyst was then calcined at 550° C. for 4 hours.

The quantity of lanthanum deposited by exchange was 6% by weight.

The monolith coated with NU-86 zeolite then exchanged with lanthanum was then impregnated by exchange with a copper acetate solution. Impregnation by exchange into the zeolite coated onto the monolith was accomplished as follows: 5 l of copper acetate solution (0.01 M) was circulated through the monolith in a closed loop for 24 hours at room temperature. The resulting copper-exchanged catalyst was washed by circulating 5 l of distilled water through the monolith, then drying at 110° C. for 8 hours.

The final heat treatment was carried out in air at 550° C. for 4 hours.

The quantity of copper deposited by exchange was 3% by weight.

Example 14 (invention)
Preparation of a Catalyst by Cu-La/NU-87 Zeolite Exchange The catalyst preparation of Example 13 was repeated, with the exception that the NU-86 zeolite was replaced by NU-87 zeolite.

Example 15 (invention)
Preparation of a Catalyst by Cu-La/EU-1 Zeolite Exchange The catalyst preparation of Example 13 was repeated, with the exception that the NU-86 zeolite was replaced by EU-1 zeolite.

Example 16 (comparative)
Preparation of a Catalyst by Cu-La/ZSM-5 Zeolite Exchange The catalyst preparation of Example 13 was repeated, with the exception that the NU-86 zeolite was replaced by ZSM-5 zeolite.

Example 17 (invention)
Preparation of a Catalyst by Pt-La/NU-86 Exchange

A monolith coated with NU-86 was prepared according to preparation described in example 1.

The monolith coated with NU-86 zeolite was then impregnated by exchange with a lanthanum nitrate solution. Impregnation by exchange into the zeolite coated onto the monolith was accomplished as follows: 5 l of lanthanum nitrate solution (0.01 M) was circulated through the monolith in a closed loop for 24 hours at room temperature. The resulting lanthanum-exchanged catalyst was washed by circulating 5 l of distilled water through the monolith, then drying at 110° C. for 8 hours. The catalyst was then calcined at 550° C. for 4 hours.

The quantity of lanthanum deposited by exchange was 6% by weight.

The monolith coated with NU-86 zeolite then exchanged with lanthanum was then impregnated by exchange with an ammoniacal solution of platinum (II) tetrammine dichloride $(Pt(NH_3)_4Cl_2.H_2O)$ at a pH of 10. Impregnation by exchange into the zeolite coated onto the monolith was accomplished as follows: 2.5 g of platinum (II) tetrammine dichloride $(Pt(NH_3)_4Cl_2.H_2O)$ was introduced into 5 l of ammoniacal solution at a pH of 10. The solution obtained circulated through the monolith in a closed loop for 24 hours at room temperature. The resulting platinum exchanged catalyst was washed by circulating 5 l of distilled water through the monolith, then drying at 110° C. for 8 hours.

The final heat treatment was carried out in air at 550° C. for 4 hours.

The quantity of platinum deposited by exchange was 1% by weight.

Example 18 (invention)
Preparation of a Catalyst by Pt-La/NU-87 Exchange

The catalyst preparation of Example 17 was repeated, with the exception that the NU-86 zeolite was replaced by NU-87 zeolite.

Example 19 (invention)
Preparation of a Catalyst by Pt-La/EU-1 Exchange

The catalyst preparation of Example 17 was repeated, with the exception that the NU-86 zeolite was replaced by EU-1 zeolite.

Example 20 (comparative)
Preparation of a Catalyst by Pt-La/ZSM-5 Exchange

The catalyst preparation of Example 17 was repeated, with the exception that the NU-86 zeolite was replaced by ZSM-5 zeolite.

For each of the catalysts described above, Table 1 shows the weight and composition by weight of the active phase deposited on the ceramic support (refractory inorganic oxides, elements from the transition metals group (A), elements from the noble metals group (B), elements from the alkaline-earths and/or rare earths group (C)).

TABLE I

COMPOSITION BY WEIGHT OF ACTIVEPHASE OF CATALYST
(amount per liter of substrate in g and weight percentage in the catalytic phase)

| Catalyst from Ex. | Composition | Wt of active phase of catalyst | Inorganic oxide | Zeolite | Transition metal oxide | Noble metal | Rare earth oxide |
|---|---|---|---|---|---|---|---|
| 1(inv.) | NU-86 | 120 g/l | 120 g/l 100% | 102 g/l 85% | | | |
| 2(inv.) | NU-87 | 120 g/l | 120 g/l 100% | 102 g/l 85% | | | |
| 3(inv.) | EU1 | 120 g/l | 120 g/l 100% | 102 g/l 85% | | | |
| 4 (comp.) | ZSM-5 | 120 g/l | 120 g/l 100% | 102 g/l 85% | | | |
| 5(inv.) | NU-86 Cu | 123.7 g/l | 120 g/l 97% | 102 g/l 82.4% | 3.7 g/l 3% | | |
| 6(inv.) | NU-87 Cu | 123.7 g/l | 120 g/l 97% | 102 g/l 82.4% | 3.7 g/l 3% | | |
| 7(inv.) | EU-1 Cu | 123.7 g/l | 120 g/l 97% | 102 g/l 82.4% | 3.7 g/l 3% | | |
| 8(comp.) | ZSM-5 Cu | 123.7 g/l | 120 g/l 97% | 102 g/l 82.4% | 3.7 g/l 3% | 1.2 g/l 1% | |
| 9(inv.) | NU-86 Pt | 121.2 g/l | 120 g/l 99% | 102 g/l 84.1% | | 1.2 g/l 1% | |
| 10(inv.) | NU-87 Pt | 121.2 g/l | 120 g/l 99% | 102 g/l 84.1% | | 1.2 g/l 1% | |
| 11(inv.) | EU-1 Pt | 121.2 g/l | 120 g/l 99% | 102 g/l 84.1% | | 1.2 g/l 1% | |
| 12(comp.) | ZSM-5 Pt | 121.2 g/l | 120 g/l 99% | 102 g/l 84.1% | | | |
| 13(inv.) | NU-86 La—Cu | 131.85 g/l | 120 g/l 91% | 102 g/l 77.3% | 3.95 g/l 3% | | 7.9 g/l 6% |
| 14 (inv.) | NU-87 La—Cu | 131.85 g/l | 120 g/l 91% | 102 g/l 77.3% | 3.95 g/l 3% | | 7.9 g/l 6% |
| 15(inv.) | EU-1 La—Cu | 131.85 g/l | 120 g/l 91% | 102 g/l 77.3% | 3.95 g/l 3% | | 7.9 g/l 6% |
| 16(comp.) | ZSM-5 La—Cu | 131.85 g/l | 120 g/l 91% | 102 g/l 77.3% | 3.95 g/l 3% | | 7.9 g/l 6% |
| 17(inv.) | Nu-86 La—Pt | 129.1 g/l | 120 g/l 92.9% | 102 g/l 79% | | 1.2 g/l 1% | 7.9 g/l 6% |
| 18(inv.) | Nu-87 La—Pt | 129.1 g/l | 120 g/l 92.9% | 102 g/l 79% | | 1.2 g/l 1% | 7.9 g/l 6% |
| 19(inv.) | EU-1 La—Pt | 129.1 g/l | 120 g/l 92.9% | 102 g/l 79% | | 1.2 g/l 1% | 7.9 g/l 6% |
| 20(comp.) | ZSM-5 La—Pt | 129.1 g/l | 120 g/l 92.9% | 102 g/l 79% | | 1.2 g/l 1% | 7.9 g/l 6% |

Example 21

The catalysts prepared on ceramic supports were laboratory tested in a micro-unit using a synthetic gas mixture comprising the principal groups of compounds present in the exhaust gas from a diesel engine. The operating conditions were as follows:

| | |
|---|---|
| Space velocity (HSV) | 50000 h$^{-1}$ |
| Composition of mixture | |
| $NO_x$ | 600 ppm vol |
| Hydrocarbons | 6000 ppmC (methane equivalent) |
| $O_2$ | 5% vol |
| $CO_2$ | 10% vol |
| CO | 500 ppm vol |
| $H_2O$ | 10% vol |
| $SO_2$ | 20 ppm vol |
| $N_2$ | complement to 100% vol |
| Temperature | increased from 150° C. to 500° C. (% ° C./min) |

The catalysts prepared in Examples 1, 2, 3 and 4, namely the catalysts with formulation NU-86, NU-87 and EU-1 and ZSM-5 zeolite, were tested with propene as the hydrocarbon.

The catalysts prepared in Examples 5, 6, 7, 8, 13, 14, 15 and 16, namely the catalysts with formulation Cu/NU-86 zeolite, Cu/NU-87 zeolite, Cu/EU-1 zeolite, Cu/ZSM-5 zeolite, Cu—La NU-86 zeolite, Cu—La/NU-87 zeolite, Cu—La/EU-1zeolite and Cu—La/ZSM-5 zeolite, were tested using propene as the hydrocarbon.

The catalysts prepared in Examples 9, 10, 11, 12, 17, 18, 19 et 20 namely the catalysts with formulation Pt/NU-86 zeolite, Pt/NU-87 zeolite, Pt/EU-1 zeolite and Pt/ZSM-5 zeolite, Pt—La/NU-86 zeolite, Pt—La/NU-87 zeolite, Pt—La/EU-1 zeolite and Pt—La/ZSM-5 zeolite were tested with n-decane as the hydrocarbon.

The principal components were analysed continuously at the reactor outlet using infrared detection analysers for carbon monoxide and nitrous oxide ($N_2O$), flame ionisation detectors for the hydrocarbons (HC) and chemiluminescence detectors for the oxides of nitrogen (NO and $NO_2$).

These analysis results enabled the changes in the oxides of nitrogen conversion, the selectivity towards nitrous oxide and the nitrogen yield to be determined as a function of the change in the reaction temperature.

The formulae used to calculate these three parameters (expressed as a %) are as follows:

| | |
|---|---|
| $NO_x$ conversion: | $C = 100 \times (NO_{x\ inlet} - NO_{x\ outlet})/NO_{x\ inlet}$ |
| $N_2O$ selectivity: | $S = 100 \times (2 \times N_2O\ formed)/NO_{x\ dispersed}$ |
| $N_2$ yield: | $R = C \times (100-S)/100$ |

Before carrying out the catalytic tests, the catalysts prepared on ceramic supports underwent heat treatment under the following conditions. The catalyst was placed in a stream constituted by 18% of oxygen, 10% of water and the complement of nitrogen, for 8 hours at 600° C. The heat treated catalysts were tested in a micro-unit with a synthetic gas mixture comprising the principal groups of the compounds present in an exhaust gas from a diesel engine, under the operating conditions described above.

Table II below shows the temperatures and the three parameters "$NO_x$ conversion", "$N_2O$ selectivity", "$N_2$ yield", calculated for test conditions corresponding to the lowest $NO_x$ emissions at the catalyst outlet (highest conversions).

TABLE II

MICRO-UNIT CATALYTIC TESTS

| Catalyst from Ex. | Composition | Max $NO_x$ conversion (%) | $N_2O$ selectivity (%) | $N_2$ yield (%) | Max conversion temperature (° C.) |
|---|---|---|---|---|---|
| 1 (inv.) | NU-86 | 40 | 1 | 39 | 480 |
| 2 (inv.) | NU-87 | 35 | 1 | 34 | 490 |
| 3 (inv.) | EU1 | 32 | 2 | 31 | 495 |
| 4 (comp.) | ZSM-5 | 30 | 4 | 29 | 500 |
| 5 (inv.) | NU-86 Cu | 55 | 7 | 51 | 295 |
| 6 (inv.) | NU-87 Cu | 48 | 5 | 45 | 305 |
| 7 (inv.) | EU-1 Cu | 45 | 3 | 43 | 310 |
| 8 (comp.) | ZSM-5 Cu | 40 | 10 | 36 | 330 |
| 9 (inv.) | NU-86 Pt | 70 | 50 | 35 | 200 |
| 10 (inv.) | NU-87 Pt | 65 | 35 | 42 | 205 |
| 11 (inv.) | EU-1 Pt | 60 | 30 | 42 | 215 |
| 12 (comp.) | ZSM-5 Pt | 55 | 75 | 14 | 240 |
| 13 (inv.) | NU-86 La-Cu | 70 | 5 | 66 | 290 |
| 14 (inv.) | NU-87 La-Cu | 65 | 3 | 63 | 300 |
| 15 (inv.) | EU-1 La-Cu | 63 | 2 | 61 | 305 |
| 16 (comp.) | ZSM-5 La-Cu | 55 | 10 | 49 | 320 |
| 17 (inv.) | Nu-86 Pt - La | 55 | 60 | 22 | 230 |
| 18 (inv.) | Nu-87 Pt - La | 50 | 45 | 27 | 235 |
| 19 (inv.) | EU-1 Pt - La | 48 | 40 | 29 | 245 |
| 20 (comp.) | ZSM-5 Pt - La | 45 | 80 | 9 | 270 |

It can be seen that maximum conversions and nitrogen yields and the lowest temperatures to attain these maxima were always in favour of the catalysts of the invention.

As a result, the catalysts of the invention perform better in reducing all oxygen-containing nitrogen compounds to molecular nitrogen: the $N_2O$ selectivities are the lowest and the nitrogen yields are the highest.

What is claimed is:

1. A process for reducing oxides of nitrogen to molecular nitrogen in a medium which is superstoichiometric in oxidizing agent using reducing agents in the presence of a catalyst comprising at least one refractory inorganic oxide containing at least one zeolite which is NU-86, NU-87 or EU-1 zeolite.

2. A process according to claim 1, in which the catalyst further contains at least one element (A) from groups VIB, VIIB, VII, IB or the transition metals.

3. A process according to claim 1, in which the catalyst further contains at least one element (B) which is a group VIII noble metal.

4. A process according to claim 1, in which the catalyst further contains at least one element (C) which is an alkaline-earth or a rare earth.

5. A process according to claim 1, wherein the composition by weight of the catalyst, expressed in weight percent with respect to the product calcined at 550° C. for 4 hours, is as follows:

55% to 100% of at least one refractory inorganic oxide comprising at least one NU-83, NU-87 or EU-1 zeolite;

0 to 20% of at least one element (A) from groups VIB, VIIB, VIII, IB or the transition metals, expressed as the oxide;

0 to 5% of at least one element (B) from group VIII noble metals; and 0 to 20% of at least one element (C) which is an alkaline-earth or a rare earth expressed as the oxide.

6. A process according to claim 1, in which the weight of NU-86 NU-87 or EU-1 zeolite with respect to the total weight of refractory inorganic oxides constituting an active phase of the catalyst is 50% to 100%.

7. A process according to claim 1, in which the refractory inorganic oxide in the catalyst is at least one of NU-86, NU-87 or EU-1 zeolite, or alumina, silica, silica-alumina, titanium oxide, zirconium oxide, a mixed oxide or a solid solution of at least two of the above oxides.

8. A process according to claim 2, in which element (A) in the catalyst is at least one of copper, nickel, cobalt, iron, manganese, chromium or molybdenum.

9. A process according to claim 8, wherein element (A) is copper.

10. A process according to claim 3, in which element (B) is at least one of platinum, rhodium, ruthenium, iridium or palladium.

11. A process according to claim 10, wherein element (B) is platinum.

12. A process according to claim 4, in which element (C) is at least one of calcium, barium, strontium, lanthanum or cerium.

13. A process according to claim 12, wherein element (C) is lanthanum.

14. A process according to claim 1, in which the catalyst is in the form of beads, extrudates or pellets.

15. A process according to claim 1, in which the catalyst is supported on a monolithic substrate.

16. A process according to claim 1, in which the oxides of nitrogen emitted by stationary engines, diesel vehicle engines, lean burn petrol vehicle engines and by turbines running on natural gas (CNG) or liquid petroleum gas (LPG) or with a liquid fuel are eliminated.

17. A process according to claim 1, wherein the reducing agents used to reduce the oxides of nitrogen are carbon monoxide, hydrogen, hydrocarbons, alcohols, ethers, organic oxygen-containing products, or fuels consumed by an engine or turbine.

18. A process according to claim 1, in which reduction of the oxides of nitrogen to molecular nitrogen in a medium which is superstoichiometric in oxidizing agents by reducing agents is carried out at a temperature in the range 150° C. to 600° C.

19. A process according to claim 1, wherein the catalyst comprises an active phase, expressed in weight percent with respect to the catalyst as calcined at 550° C. for 4 hours, as follows:

80% to 99% of at least one refractory inorganic oxide comprising at least one NU-86, NU-87 or EU-1 zeolite;

1 to 10% of at least one element (A) from groups VIB, VIIB, VIII, IB or the transition metals, expressed as the oxide.

20. A process according to claim 19, wherein the catalyst further comprises 0.1% to 10% by weight of at least one alkaline-earth or rare earth, expressed as the oxide.

21. A process according to claim 1, wherein the catalyst comprises an active phase, expressed in weight percent with respect to the catalyst as calcined at 550° C. for 4 hours, as follows:

87% to 99.9% of at least one refractory inorganic oxide comprising at least one NU-86, NU-87 or EU-1 zeolite;

0.1 to 3% of at least one group VIII noble metal.

22. A process according to claim 1, further comprising preparing the catalyst from a support by:

a) impregnating a support comprising at least one of NU-86, NU-87 or EU-1 zeolite using at least one precursor of at least one group VIB, VIIB, VIII or IB element, a transition metal, or group VIII noble metal;

b) optionally, adding an alkaline-earth, or rare earths, by impregnating with at least one precursor of at least one group IIA or IIB element, before or after impregnation; and c) optionally, heat treating in an oxidizing, neutral or reducing medium after each impregnation, at a temperature of 200° C. to 700° C.

23. A process according to claim 22, further comprising coating a monolithic support with at least one refractory inorganic oxide before or after at least one of the impregnation and heat treatment of a) to c).

\* \* \* \* \*